United States Patent

Komiya et al.

[11] Patent Number: 5,771,676
[45] Date of Patent: Jun. 30, 1998

[54] PIVOT ANGLE LIMITING STOPPER STRIKING NOISE SUPPRESSING DEVICE OF CABLE DRAG CHAIN

[75] Inventors: Shoichiro Komiya, Hyogo; Hiroshi Nishimura; Takashi Yaono, both of Osaka, all of Japan

[73] Assignee: Tsubakimoto Chain Co., Osaka, Japan

[21] Appl. No.: 735,589

[22] Filed: Oct. 23, 1996

[30] Foreign Application Priority Data

Oct. 27, 1995 [JP] Japan ................................. 7-280656

[51] Int. Cl.$^6$ .............................................. F16G 13/16
[52] U.S. Cl. .................... 59/78.1; 59/900; 248/49
[58] Field of Search ................... 59/78.1, 900; 248/49

[56] References Cited

U.S. PATENT DOCUMENTS

| | | |
|---|---|---|
| 4,833,876 | 5/1989 | Kitao et al. . |
| 5,048,283 | 9/1991 | Moritz et al. ........................... 59/78.1 |
| 5,108,350 | 4/1992 | Szpakowski ............................ 59/78.1 |
| 5,174,104 | 12/1992 | Wehler et al. .......................... 59/78.1 |

FOREIGN PATENT DOCUMENTS

| | | |
|---|---|---|
| 0 286 442 | 10/1988 | European Pat. Off. . |
| 1817593 | 11/1970 | Germany ............................. 59/78.1 |
| 26 56 585 | 6/1978 | Germany . |
| 30 25 838 | 2/1981 | Germany . |
| 296 07 171 U1 | 7/1996 | Germany . |
| 100948 | 6/1989 | Japan . |
| 05-141481 | 6/1993 | Japan . |
| 5-141481 | 6/1993 | Japan . |

Primary Examiner—David Jones
Attorney, Agent, or Firm—Armstrong, Westerman Hattori, McLeland & Naughton

[57] ABSTRACT

A pivot angle limiting stopper striking noise suppressing device is provided to prevent a pivot angle limiting stopper of a cable drag chain from generating striking noises, thereby avoiding deformation of the stopper and abrasive wear of abutment surfaces. The pivot angle limiting stopper striking noise suppressing device includes a cushioning material attached to an abutment surface of a pivot angle limiting stopper to absorb a shock impact.

14 Claims, 6 Drawing Sheets

PIVOT ANGLE LIMITING STOPPER STRIKING NOISE SUPPRESSING DEVICE OF CABLE DRAG CHAIN

FIELD OF THE INVENTION

The present invention relates to a cable drag chain receiving, for protection, and guiding a power-supplying flexible strand, such as a cable hose.

BACKGROUND OF THE INVENTION

Conventional cable drag chains include an open type and a closed type which are respectively exemplified by one disclosed in the specification and drawings of Japanese Patent Laid-open Publication No. HEI 5-141481, and one disclosed in the specification and drawings of Japanese Utility Model Application No. SHO 62-195934 (Utility Model Laid-open Publication No. HEI 1-100948).

In either type of the conventional cable drag chains, a series of links are connected together so as to form a chain with each link including a stopper provided at a pivot portion for limiting a pivot angle of the link plate relative to the adjacent link plate.

According to the conventional chains previously described, the stopper while in action generates striking noises due to abutting engagement between two mating stopper surfaces, thus constituting a noise problem. The abutting engagement also causes flexural deformation and abrasive wear on a portion of the abutment, resulting in a cable drag chain with a reduced life time.

To solve the foregoing problems, the present invention provides a cushioning material attached to an abutment surface of a stopper, or a cushioning brake member attached to or in the vicinity of an abutment surface of a stopper. As an alternative, in the case of a closed type cable drag chain, the invention provides a cushioning seal member fitted with an overlapping portion of two adjacent end edges of cover members spanning two confronting rows of link plates.

By virtue of the cushioning member attached to the stopper abutment surface, the cushioning brake member attached to or in the vicinity of the stopper abutment surface, or the cushioning seal member fitted with the overlapping portion between the adjacent end edges of the cover members, striking noises generated when the stopper comes into action can be absorbed or suppressed by the cushioning member, the cushioning brake member, or the cushioning seal member.

BRIEF DESCRIPTION OF THE DRAWINGS

FIG. 1(B) shows the same chain of FIG. 1(A) in the floating horizontal condition.

FIG. 2(B) shows the same chain of FIG. 2(A) in the floating horizontal condition.

FIG. 3(B) is a fragmentary front elevational view, with parts in cross section, of the pivot angle limiting stopper of FIG. 3(A) when the link plates disposed are in a bent condition. FIG. 3(C) is a front elevational view, with parts in cross section, of the pivot angle limiting stopper of FIG. 3A when the link plates are in the floating horizontal condition.

FIG. 5(A) is a fragmentary front elevational view, with parts in cross section, of a modified pivot angle limiting stopper when the link plates are in a bent condition. FIG. 5(B) is a fragmentary front elevational view, with parts in cross section, of the modified pivot angle limiting stopper when the link plates are in the floating horizontal condition.

FIG. 6(A) is a plan view of a main portion of a closed type cable drag chain. FIG. 6(B) is a front elevational cross-sectional view of cover members of FIG. 6(A) when the link plates are in a bent condition. FIG. 6(C) is a front elevational cross-sectional view of the cover members of FIG. 6(A) when the link plates are in the floating horizontal condition.

FIG. 7(A) is a front elevational view of a main portion of an open type cable drag chain. FIG. 7(B) is an enlarged plan view of a pivot angle limiting stopper pin attached to the link plates. FIG. 7(C) is a fragmentary front elevational view of a link plate having a pair of arcuate stopper guide holes of FIG. 7(A) in which the stopper pins are guidedly received.

DETAILED DESCRIPTION OF THE INVENTION

Figure 1A:
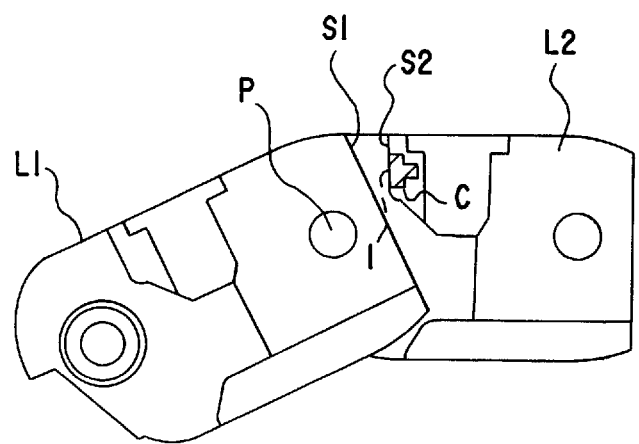
FIGS. 1(A) and 1B is a front elevational view of a main portion of a cable drag chain according to a first embodiment of the present invention, showing the cable drag chain in a bent condition
Figure 1B:
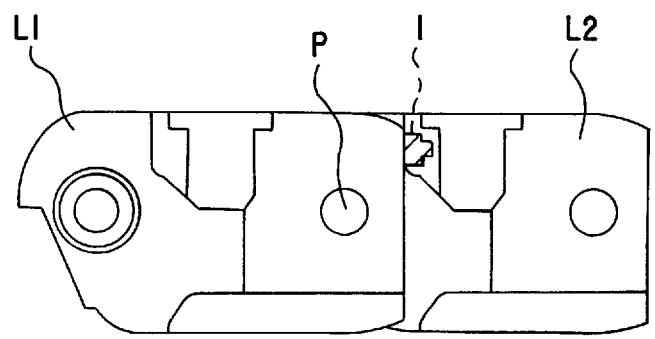

FIGS. 1(A) and 1(B) shows a front elevational view of link plates of a main portion of a cable drag chain according to a first embodiment, showing the link plates in a bent condition. FIG. 1(B) shows the link plates of FIG. 1(A) in a floating horizontal condition. Two adjacent link plates L1 and L2 connected by a pin P each have a pivot angle limiting stopper having an abutment surface S1 or S2. One of the abutment surfaces S1 and S2 has a recess C in which a cushioning member 1 is received with a part of the cushioning member 1 projecting from the abutment surface S1 or S2 (in this figure, the recess C is formed in the abutment surface S2 from which the cushioning member 1 partly projects).

When the link plate L1 angularly moves or turns from the bent position shown in FIG. 1(A) in the clockwise direction about the pin P, the abutment surface S1 of the link plate L1 strikes against the abutment surface S2. In this instance, however, the abutment surface S1 first comes into contact with the cushioning member 1 and subsequently forces it to become compressed or otherwise deformed during which time the cushioning member 1 acts to absorb or suppress the striking noise generated from the abutment surfaces S1 and S2. Deformation of the cushioning member 1 is taken up as it is accommodated in the recess C.

Figure 2A:
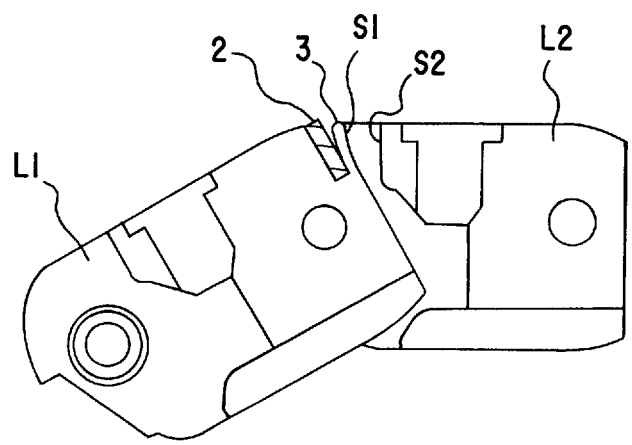
FIGS. 2(A) and 2B is a view showing a modification of the first embodiment shown in FIG. 1(A), 2 illustrating the modified cable drag chain in a bent condition.
Figure 2B:
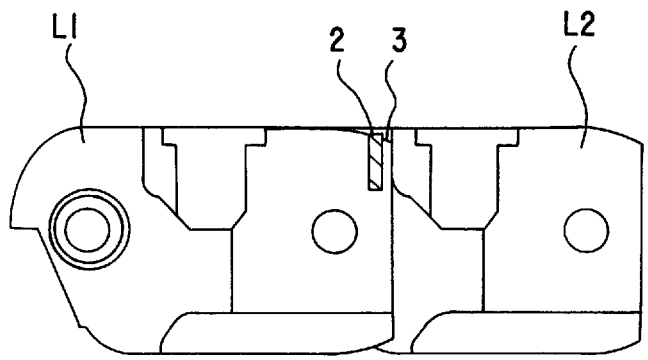

FIGS. 2(A) and 2(B) show another embodiment including a modified form of the pivot angle limiting stopper of the embodiment of FIGS. 1(A) and 1(B) In this embodiment, two adjacent link plates L1 and L2 have respective pivot angle limiting stopper abutment surfaces S1 and S2 one of which (the abutment surface S1 of the link plate L1 in this figure) forms a part of a resilient tongue 3 provided such that a cushioning plate 2 is sandwiched between a body of the link plate L1 and the resilient tongue 3.

Figure 3A:
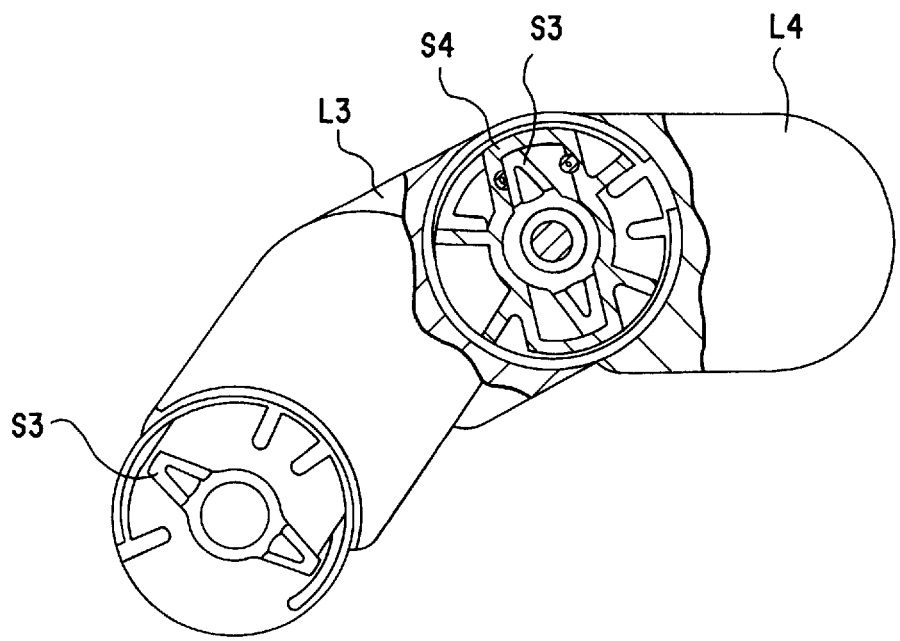
FIGS. 3(A), 3B, and 3C is a front elevational view of a main portion of a cable drag chain according to a second embodiment of the present invention, showing a front elevational view, with parts in cross section, of a pivot angle limiting stopper.
Figure 3B:
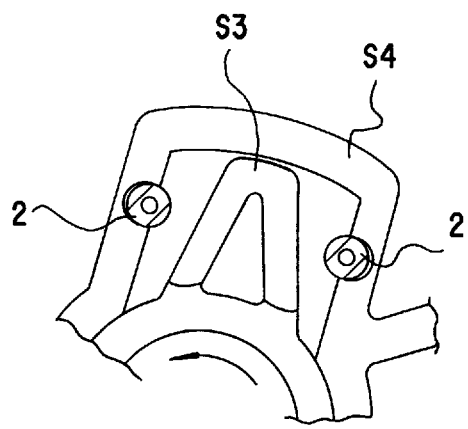
Figure 3C:
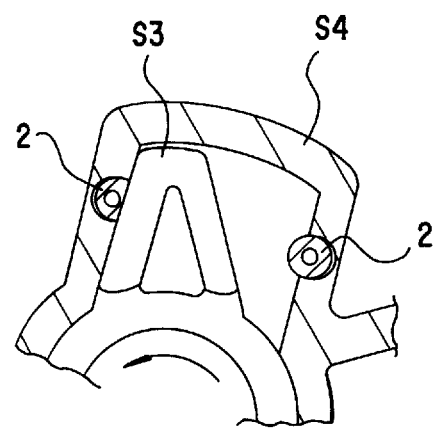

FIGS. 3(A)–3(C) shows a pivot angle limiting stopper, according to a second embodiment, formed on overlapping surfaces at a joined end of two adjacent link plates L3 and L4 of a cable drag chain. The stopper is of the same type as the pivot angle limiting stopper provided on a conventional table drag chain disclosed in Japanese Patent laid-open Publication No. HEI 5-141481 specified above.

The overlapping surfaces have two confronting surface portions one of which has a projecting stopper member S3, the other confronting surface portion having a projecting stopper member S4 indicated by cross-hatching. The stopper member S3 is fitted within the stopper member S4.

FIGS. 3(B) and 3(C) are enlarged explanatory views of the stopper members S3 and S4. The stopper members S3, S4 have two pairs of abutment surfaces each of which has a pair of recesses formed in one of the stopper members S3 and S4 (the stopper member S4 in these figures). The recesses are fitted with a pair of cushioning hollow members 2, 2, respectively. When the stopper members S3 and S4 come into abutment with each other, one of the cushioning hollow members 2 is compressed or otherwise deformed, as shown in FIG. (3(C)), during which time an impact energy is taken up or absorbed by the cushioning hollow member 2. In this way, generation of striking noise can be avoided.

The cushioning hollow members 2, 2 may be replaced with cushioning solid members, or an abrasion-resistant rigid elastic material having a soft core.

Figure 4:
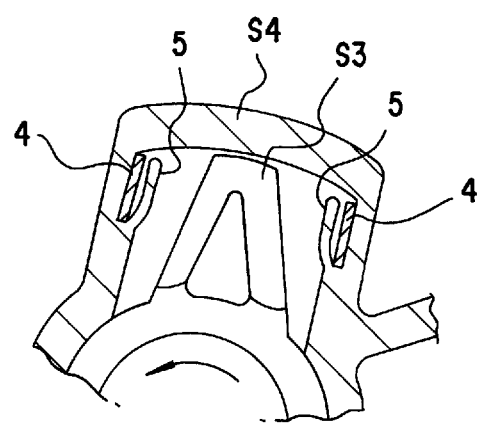
FIG. 4 is a fragmentary front elevational view of a pivot angle limiting stopper according to a modification of the second embodiment shown in FIG. 3.

As shown in FIG. 4, one of two mating abutment surfaces of the stopper members S3 and S4 forms a part of a resilient tongue 5 provided on the stopper member S3 or S4 (the stopper member S4 in the illustrated embodiment) such that a cushioning material 4 is held or sandwiched between a body of the stopper member S4 and the resilient tongue 5.

Figure 5A:
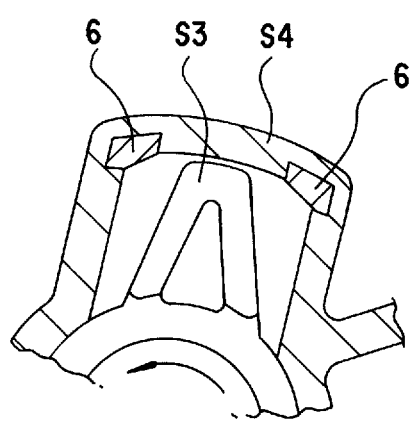
FIGS. 5(A) and 5(B) illustrate a further modification of the second embodiment shown in FIGS. 3(A), and 3(B)
Figure 5B:
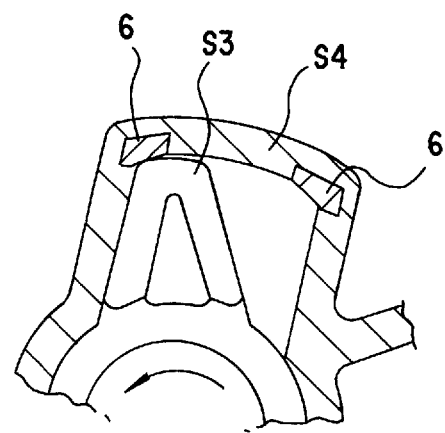

As shown in FIGS. 5(A) and 5(B) it is further possible to provide a pair of cushioning brake members 6, 6 disposed near opposed abutment surfaces of the stopper member S4 for slowing down the speed of abutment between the stopper members S3 and S4 to avoid generation of striking noises.

Figure 6A:
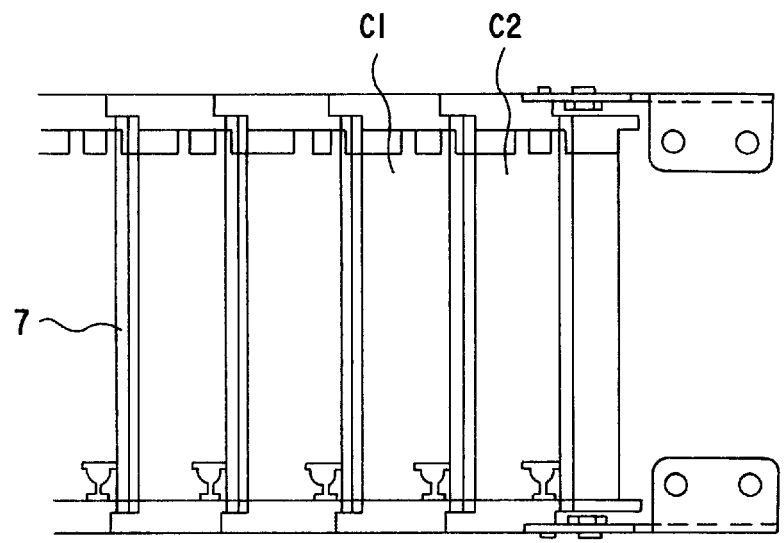
FIGS. 6(A)–6(C) illustrate a third embodiment of the present invention.
Figure 6B:
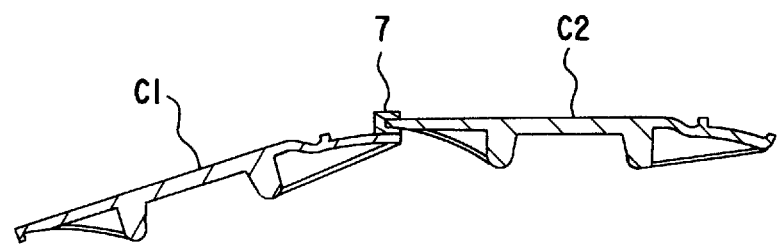
Figure 6C:
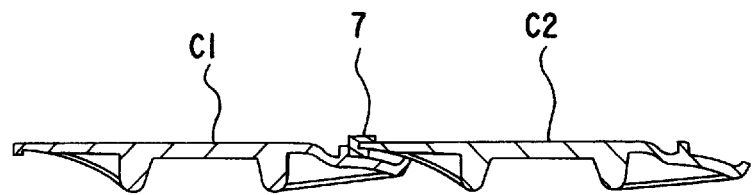

FIGS. 6(A)–6(C) a third embodiment of the present invention which is embodied in a cover member striking noise suppression member incorporated in a conventional closed type cable drag chain disclosed in Japanese Utility Model Laid-open Publication No. HEI 11-100948 specified above. In FIG. 6(A) is a fragmentary plan view of the third embodiment, FIG. 6(B) is a front elevational cross-sectional view of FIG. 6(A) showing cover members in a bent position, and FIG. 6(C) is a front elevational cross-sectional view showing the cover members in a floating horizontal position. A cushioning seal member 7 is fitted around a rear end edge of a cover member C2 so as to seal a clearance between a front end edge of a cover member C1 and the rear end edge of the cover member C2 and absorb a shock force when the front end edge of the cover member C1 is brought into abutment with the rear end edge of the cover member C2 in response to pivotal movement of the cover member C1 from the bent position of FIG. 6(B) to the horizontal position shown in FIG. 6(C).

Figure 7A:
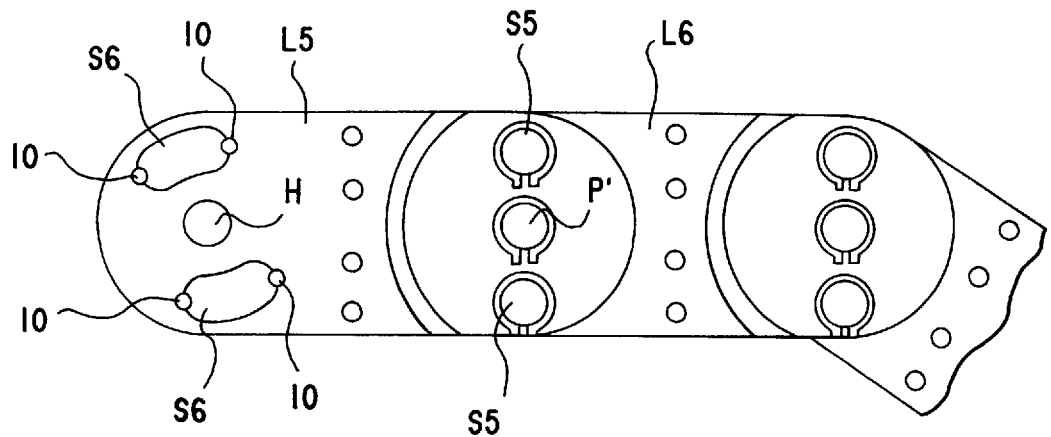
FIGS. 7(A)–7(C) shows a fourth embodiment of the present invention.
Figure 7B:
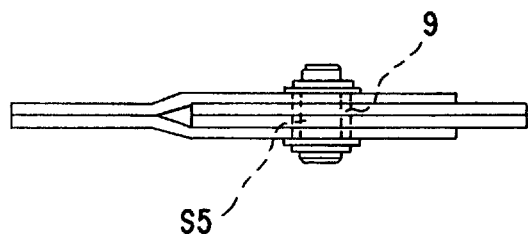
Figure 7C:
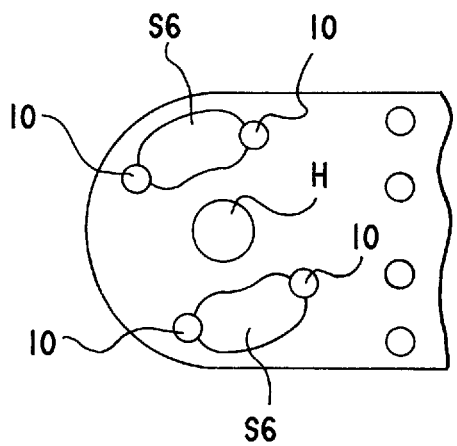

FIGS. 7(A)–7C) shows a fourth embodiment of the present invention which is embodied in a striking noise suppression member acting between a pivot angle limiting stopper pin S5 and an arcuate stopper guide hole S6 of an open type cable drag chain composed of steel link plates. In FIG. 7(A), is a fragmentary front elevational view of the cable drag chain. The cable drag chain includes a plurality of link plates L5, L6 each connected by a connecting pin P' to the adjacent link plate, a pair of stopper pins S5, S5 disposed on a circle concentric to the connecting pin P' for limiting an angle of pivotal movement of two adjacent links L5 and L6 about the connecting pin P', and a pair of arcuate stopper guide holes S6, S6 receiving the stopper pins S5, S5, respectively, and guiding pivotal movement of the stopper pins S5, S5.

Reference character H denotes a through-hole receiving therein the connecting pin P'.

Thus, relative pivotal movement of the link plates L5 and L6 is limited within the length of a circular arc of the arcuate stopper guide holes S6, S6 about the connecting pin P'. With this limitation, a connecting portion between the adjacent links is prevented from buckling when the cable drag chain is in the floating horizontal condition. When the cable drag chain takes a U-turn, it is brought from the bent condition to the floating horizontal condition. In this instance, the stopper pins S5 abut against opposite ends of the respective arcuate stopper guide holes S6 to limit the angle of pivotal movement of the link plates about the connecting portion, thereby generating striking noises. The striking noises can be suppressed or substantially eliminated either by cushioning materials 9 fitted over the respective stopper pins S5, or by cushioning materials 10 attached to the opposite ends of the arcuate stopper guide holes S6.

When the cable drag chain completes a U-turn, it is brought to a floating horizontal position. In this instance, a multiplicity of link plates constituting the chain are kept in the floating horizontal position by pivot angle limiting stoppers without causing downward buckling at respective joint portions. According to the present invention, there is provided a cushioning material attached to an abutment surface of each of the pivot angle limiting stoppers, a cushioning brake member in the vicinity of the abutment surface, a cushioning seal member disposed in an overlapping portion of adjacent edges of cover members of a closed type cable drag chain, or a cushioning material disposed on an abutting portion between a pivot angle limiting stopper disposed on a circle concentric to a connecting pin of each pair of adjacent link plates, and an arcuate stopper guide hole receiving and guiding the stopper pin. The cushioning material is subjected to compressive deformation to avoid generation of striking noises with the result that an excellent sound-deadening effect can be attained. The abutment surface is brought into abutting engagement with a mating abutment surface via the cushioning material, so that flexural deformation of the stopper and abrasive wear of the abutment surfaces can be avoided. Furthermore, the stopper can retain a desired force to keep the cable drag chain in the floating horizontal position, have an improved durability, and thus, never incorporate generation of waste powder due to abrasion.

In the case where the striking noises might be increased due to an increase in load or weight of a cable, a hose, or similar received in the cable drag chain, the material of the cushioning member can be readily changed to increase its sound-deadening effect. Thus, the desired striking noise suppressing action of the cushioning member can be retained.

What is claimed is:

1. In a cable drag chain having a plurality of link assemblies connected end to end, each of said link assemblies including link plates juxtaposed to each other, said link plates each link assembly being rotatably connect to respective link plates of adjacent link assemblies to form pairs of connected adjacent link plates, at least one pair of said connected adjacent link plates having a pivot angle limiting stopper, said limiting stopper comprising abutment surfaces on each of said one pair of connected adjacent link plates, the improvement comprising a cushioning material being provided between said abutment surfaces, thereby suppressing striking noise.

2. A cable drag chain according to claim 1, wherein said cushioning material is attached to one of said abutment surface.

3. A cable drag chain according to claim 1, wherein said cushioning material is embedded within a recess formed on one of said abutment surface.

4. In a cable drag chain having a plurality of link assemblies connected serially end to end, each of said link assemblies including link plates juxtaposed to each other, said link plates of each link assembly being rotatably connect to respective link plates of adjacent link assemblies to form pairs of connected adjacent link plates, at least one pair of said connected adjacent link plates having a pivot angle limiting stopper, said limiting stopper comprising abutment surfaces on each of said one pair of connected adjacent link plates, the improvement comprising a cushioning material being provided on one of said abutment surfaces, thereby suppressing striking noise.

5. In a cable drag chain having a plurality of link assemblies connected serially end to end, each of said link assemblies including link plates juxtaposed to each other, said link plates of each link assembly being rotatably connect to respective link plates of adjacent link assemblies to form pairs of connected adjacent link plates, at least one pair of said connected adjacent link plates having a pivot angle limiting stopper said limiting stopper comprising abutment surfaces on each of said one pair of connected adjacent link plates, the improvement comprising one of said abutment surfaces having a resilient tongue depending therefrom, and a cushioning material sandwiched between said one abutment surface and said resilient tongue, thereby suppressing striking noise.

6. In a cable drag chain having a plurality of link assemblies connected serially in overlapping end to end fashion, each of said link assemblies including link plates juxtaposed to each other, said link plates of each link assembly being rotatably connect to respective link plates of adjacent link assemblies to form pairs of connected adjacent link plates, at least one pair of said connected adjacent link plates having a pivot angle limiting stopper said limiting stopper being formed on overlapping surfaces between said connected adjacent link plates, said pivot angle limiting stopper having abutment surfaces in said overlapping surfaces, the improvement comprising at least one cushioning material being provided between said abutment surfaces, thereby suppressing striking noise.

7. A cable drag chain according to claim 6, wherein said cushioning material is attached to one of said abutment surface.

8. A cable drag chain according to claim 6, wherein said cushioning material is embedded within a recess formed on one of said abutment surface.

9. In a cable drag chain having a plurality of link assemblies connected serially in overlapping end to end fashion, each of said link assemblies including link plates juxtaposed to each other, said link plates of each link assembly being rotatably connected to respective link plates of adjacent link assemblies to form pairs of connected adjacent link plates, at least one pair of said connected adjacent link plates having a pivot angle limiting stopper, said limiting stopper formed on overlapping surfaces between said pair of connected link plates, each link plate having a confronting surface portions, said pivot angle limiting stopper having abutment surface on said confronting surface portions, one of said confronting surface portions having a first projecting stopper member projecting out therefrom, the other of said confronting surface portions having a second projecting stopper member projecting out therefrom, said first projecting stopper having a pair of radial arms, said second projecting stopper surrounding said first projecting stopper such that said first projecting stopper can rotate within said second projecting stopper, said abutment surfaces being formed on surfaces of said first projecting stopper and second projecting stopper, the improvement comprising cushioning materials being provided between said abutment surfaces of said first projecting stopper and second projecting stopper, thereby suppressing striking noise.

10. A cable drag chain according to claim 9, wherein said cushioning materials are attached to one of said abutment surface.

11. A cable drag chain according to claim 9, wherein said cushioning materials are embedded within a recess formed on one of said abutment surface.

12. A cable drag chain according to claim 9, wherein one of said abutment surfaces comprises a resilient tongue depending therefrom, and said cushioning materials being sandwiched between said said one abutment surface and said resilient tongue.

13. A cable drag chain according to claim 9, wherein said second projecting stopper comprises wall portions forming abutment surfaces and a bridge portion connecting said wall portions, said cushioning materials being attached to said wall portions where said bridge portion connects so as to confront the abutment surfaces of said first projecting stopper.

14. In a cable drag chain having a plurality of link assemblies connected serially end to end, each of said link assemblies including link plates juxtaposed to each other each link plate having an upper and lower end, and cover members connecting said upper and lower ends of said link plates thereby forming each of said link assemblies, said link plates of each link assembly being rotatably connect to respective link plates of adjacent link assemblies, at least two of said adjacent link assemblies having a pivot angle limiting stopper, said limiting stopper comprising abutment surfaces on said cover members of each of said link assemblies, the improvement comprising a cushioning material being provided on one of said abutment surfaces, thereby suppressing striking noise.

* * * * *